(12) United States Patent
Sikora et al.

(10) Patent No.: US 8,171,290 B1
(45) Date of Patent: *May 1, 2012

(54) SYSTEM FOR AUTHENTICATING REMOTELY GENERATED OPTICAL CONTROL SIGNALS

(75) Inventors: Scott T. Sikora, Gilbert, AZ (US);
William H. Conley, III, Marana, AZ (US)

(73) Assignee: Tomar Electronics, Inc., Gilbert, AZ (US)

( * ) Notice: Subject to any disclaimer, the term of this patent is extended or adjusted under 35 U.S.C. 154(b) by 210 days.

This patent is subject to a terminal disclaimer.

(21) Appl. No.: 12/620,401

(22) Filed: Nov. 17, 2009

Related U.S. Application Data

(63) Continuation of application No. 11/020,488, filed on Dec. 23, 2004, now Pat. No. 7,620,812.

(51) Int. Cl.
*H04L 9/00* (2006.01)
*B60R 25/10* (2006.01)

(52) U.S. Cl. ........ 713/168; 713/182; 380/255; 340/902; 340/906; 340/907; 340/917; 340/426.1; 340/426.13; 340/426.35; 340/426.36; 701/1; 701/117

(58) Field of Classification Search .................. 713/168, 713/182, 189; 726/2; 380/255, 270; 340/902, 340/906, 907, 909, 917, 426.1, 426.13, 426.35, 340/426.36; 701/1, 117
See application file for complete search history.

(56) References Cited

U.S. PATENT DOCUMENTS

| | | | | |
|---|---|---|---|---|
| 5,083,125 A * | 1/1992 | Brown et al. | ................. | 340/906 |
| 5,172,113 A * | 12/1992 | Hamer | ......................... | 340/907 |
| 5,602,739 A * | 2/1997 | Haagenstad et al. | .......... | 701/117 |
| 6,329,909 B1 * | 12/2001 | Siedentop et al. | ........... | 340/5.62 |
| RE38,870 E * | 11/2005 | Hall | ............................. | 701/301 |
| 7,620,812 B2 * | 11/2009 | Sikora et al. | ................... | 713/168 |
| 2003/0222757 A1 * | 12/2003 | Ghabra et al. | ............... | 340/5.72 |
| 2004/0083374 A1 * | 4/2004 | Sugawara | ..................... | 713/189 |
| 2005/0009511 A1 * | 1/2005 | Bostrom et al. | .............. | 455/419 |
| 2005/0151629 A1 * | 7/2005 | Simoneau | ................ | 340/426.11 |
| 2006/0273925 A1 * | 12/2006 | Schwartz | ...................... | 340/907 |

* cited by examiner

*Primary Examiner* — Nasser Goodarzi
*Assistant Examiner* — Shanto M Abedin
(74) *Attorney, Agent, or Firm* — Booth Udall, PLC

(57) ABSTRACT

An authentication system authenticates remotely generated optical control signals. A remote optical emitter transmits an optical control signal from a remote location. A remote authentication device collocated with the remote optical emitter receives an authentication challenge signal and transmits a compatible authentication response signal. A control optical signal processor positioned at a first location receives the optical control signal from the remote optical emitter and generates a control output signal in response to detection of a valid optical control signal. An authentication device is coupled by a real time data communications link with the optical signal processor and with the remote optical emitter. The control authentication device receives the control output signal from the optical processor, transmits the authentication challenge signal to the remote authentication device in response to receipt of the control output signal and generates an authenticated control output signal in response to receipt of a valid authentication response signal from the remote authentication device.

22 Claims, 12 Drawing Sheets

SYSTEM FOR AUTHENTICATING REMOTELY GENERATED OPTICAL CONTROL SIGNALS

CROSS REFERENCE TO RELATED APPLICATIONS

This document is a continuation application of the earlier U.S. Utility Patent Application to Sikora et al. entitled "System for Authenticating Remotely Generated Optical Control Signals," application Ser. No. 11/020,488, filed Dec. 23, 2004, which issues as U.S. Pat. No. 7,620,812 on Nov. 17, 2009, the disclosure of which is hereby incorporated herein by reference.

BACKGROUND OF THE INVENTION

1. Field of the Invention

This invention relates to authentication systems and, more particularly to systems for authenticating remotely generated optical control signals.

2. Description of the Prior Art

U.S. Pat. No. 5,519,389 was issued to Tomar Electronics, Inc. of Gilbert, Ariz. on May 21, 1996 and is entitled "Signal Synchronized Digital Frequency Discriminator." The disclosure of the Tomar '389 patent is hereby incorporated by reference.

The Tomar '389 patent at FIGS. 11-13 discloses a directional optical signal detector 86 which includes a directional tubular optical input port 84 which transmits to photodetector 102 only incoming optical signals falling within a relatively narrow angular range of the aiming direction of input port 84 itself. The Tomar '389 patent also discloses an electronic circuit capable of discriminating in a noisy signal environment a pulsed strobe flash lamp emitter. Such emitters are typically coupled to emergency vehicles such as police cars or fire trucks or to transit vehicles such as buses to activate a traffic signal preemption system. Traffic preemption emitters typically operate at a fixed, relatively fast pulse repetition rate such as, for example, fourteen pulses per second.

The patented optical signal detector disclosed in the Tomar '389 patent and as generally illustrated in FIG. 1 of the present document is coupled in proximity to or collocated with a traffic controller and a signal head. When an emergency vehicle which has activated its strobe flash lamp emitter to generate traffic preemption signaling pulses moves within signal acquisition range of an optical signal detector as illustrated in FIG. 1, the optical signal detection circuitry disclosed in the Tomar '389 patent detects that optical control signal and generates a preemption output signal identified in FIG. 1 as a "valid optical control signal." Transmitting that preemption signal to the FIG. 1 traffic controller initiates a controller cycle which after a defined time delay interval activates the green signal light on the signal head aimed at the emergency vehicle or transit vehicle allowing that vehicle to pass through the controlled intersection on a priority basis out of turn with the normal traffic controller cycle.

The Tomar '389 patent application was filed in 1992 and issued in 1996. The patented Tomar traffic preemption control system has experienced great commercial success over the years. Because compatible high pulse repetition rate preemption strobe emitters are not patented, third party vendors, particularly since the advent of on-line purchasing and distribution, have been able to sell such emitters on the open market potentially to purchasers other than governmental entities such as police departments, fire departments and transit authorities. The Tomar '389 patent discloses traffic control locations in addition to lighted intersections such as garage doors, security gates, industrial facilities, motor controlled gate systems, and other electrically controlled security gates.

As a result of current security and safety concerns, governmental entities having legitimate access to traffic preemption systems have been searching for a means to render their optically actuated traffic preemption systems secure such that they cannot be activated by unauthorized persons or vehicles utilizing unauthorized preemption compatible emitters. The present authentication system invention has been developed to meet that need.

SUMMARY OF THE INVENTION

Briefly stated, and in accord with one embodiment of the invention, an authentication system authenticates remotely generated optical control signals and includes a remote optical emitter, a remote authentication device, an optical signal processor and a control authentication device. The remote optical emitter transmits an optical control signal from a remote location. The remote authentication device is typically collocated with the remote optical emitter and receives an authentication challenge signal and transmits a compatible authentication response signal. A control optical signal processor may be positioned at a first location for receiving the optical control signal from the remote optical emitter and for generating a control output signal in response to detection of a valid optical control signal. An authentication device is coupled by a real time data communications link with the optical signal processor and with the remote optical emitter. The authentication device receives the control output signal from the optical signal processor, transmits the authentication challenge signal to the remote authentication device in response to receipt of the control output signal and generates an authenticated control output signal in response to receipt of a valid authentication response signal from the remote authentication device.

DESCRIPTION OF THE DRAWINGS

The invention is pointed out with particularity in the appended claims. However, other objects and advantages together with the operation of the invention may be better understood by reference to the following detailed description taken in conjunction with the following illustrations, wherein:

DESCRIPTION OF THE PREFERRED EMBODIMENT

In order to better illustrate the advantages of the invention and its contributions to the art, a preferred hardware embodiment of the invention will now be described in some detail.

Figure 1:
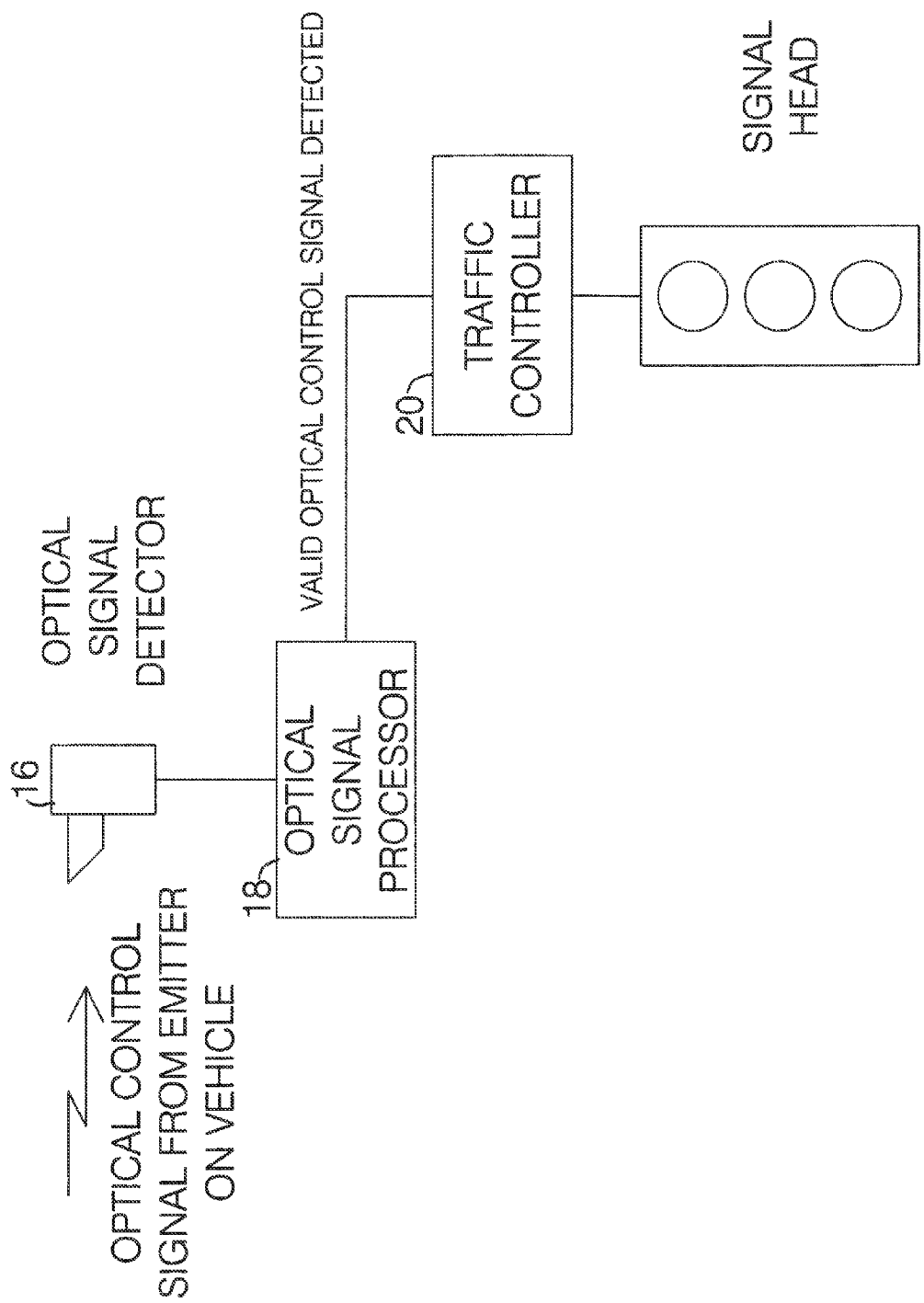
FIG. 1 illustrates a prior art optically actuated traffic preemption system.
Figure 2:
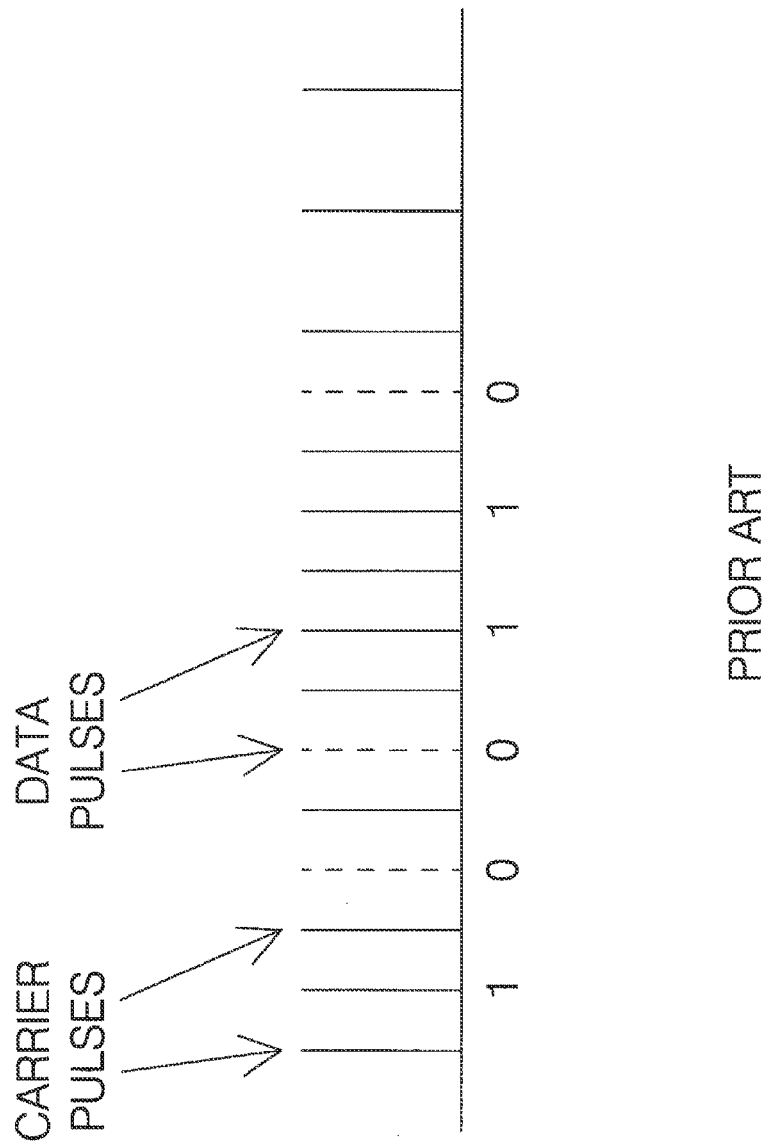
FIG. 2 represents a timing diagram illustrating one prior art method of embedding coded data pulses within a fixed train of carrier pulses for the purpose of transmitting a form of encoded optical control signal from a vehicle emitter to an optical signal detector.

As described above, the FIG. 1 system is subject to potential abuse and misuse due to the relatively widespread distribution of strobe emitters capable of emitting the high pulse rate repetition rate preemption signals required to activate the existing network of traffic preemption controllable intersection traffic control systems. FIG. 2 represents a timing diagram illustrating one existing methodology for adding security to existing optically actuated traffic preemption systems. As illustrated by the FIG. 2 timing diagram, the preemption system activating carrier pulses incorporate interspersed data pulses which correlate with specific binary codes used to identify emergency or transit vehicles with the hope that unauthorized vehicles will not be capable of activating such modified preemption systems. This system, however, can readily be defeated by merely recording the optical output pulse train of any coded optical emitter generating the intervening optical data pulses as illustrated in FIG. 2. By simple analysis of that physical recording of the data pulse train, an unauthorized user could readily program an emitter to duplicate the coded data pulse train of the licensed/authorized emitter and activate any existing preemption system protected by this technology.

Figure 3:
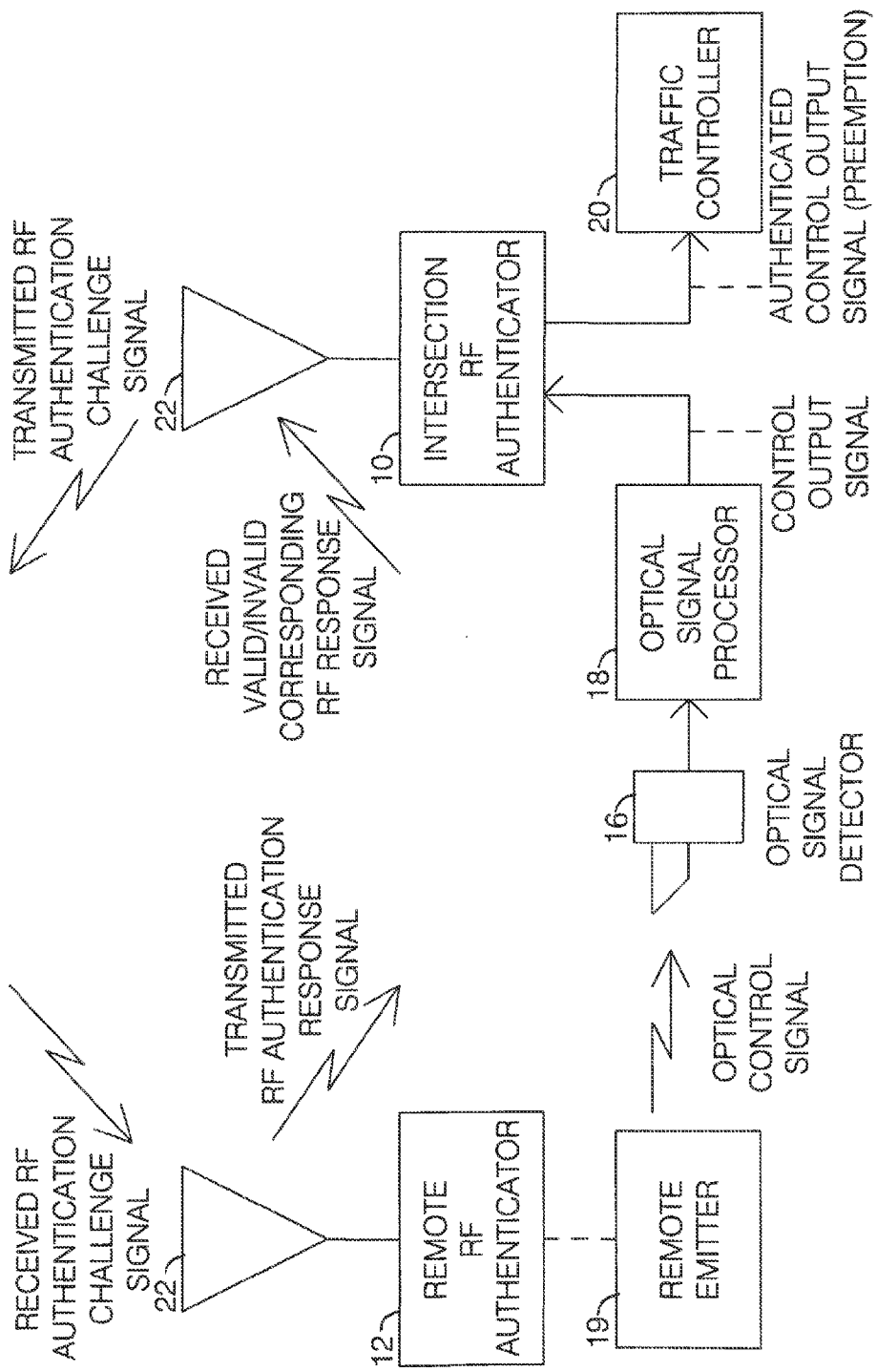
FIG. 3 is a block diagram representation of one embodiment of the authentication system of the present invention having a fixed element located at a traffic intersection and a mobile element located on a vehicle.

Referring now to FIG. 3, which illustrates a generalized block diagram of one preferred embodiment of the invention, the authentication system of the present invention requires only that the following two elements be added to an existing stand alone prior art traffic preemption system to render it highly secure: 1) an intersection RF authenticator 10, and 2) a remote RF authenticator 12. With those two exceptions, the traffic preemption system illustrated in the FIG. 3 block diagram is identical to the prior art traffic preemption system illustrated in FIG. 1. Both systems utilize the industry standard remote emitter 14 which generates an optical traffic preemption signal to be detected by optical signal detector 16. As described in the Tomar '389 patent, optical signal detector 16 is capable of receiving all optical input signals, but then discriminates and detects only optical signals having a pulse repetition rate falling within a predetermined preemption-activating bandwidth. When such in-bandwidth optical preemption signals are received and detected, optical signal detector 16 passes a preemption output signal to optical signal processor 18 which in prior art systems as illustrated in FIG. 1 would be directly coupled to the preemption input of traffic controller 20.

With the present invention, however, the control output signal from the output of optical signal detector 16 has been rerouted to the input of a new system element designated as intersection RF authenticator 10.

Figure 4:
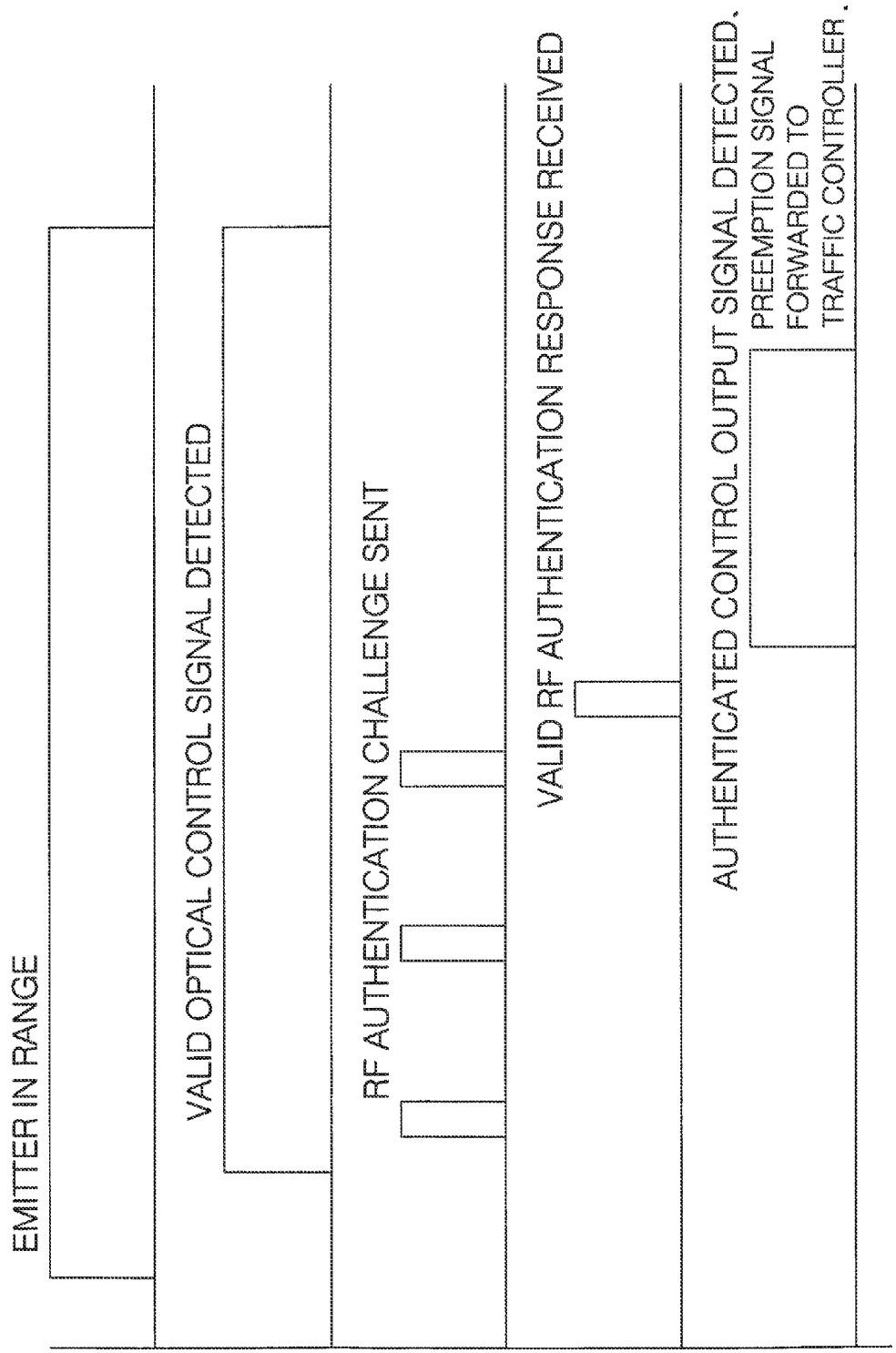
FIG. 4 represents a timing diagram illustrating operation of the system shown in FIG. 3.

Referring now to FIGS. 3 and 4, RF authenticator 10 which includes a radio frequency (RF) transceiver transmits an RF authentication challenge signal over a substantially omni-directional transceiver antenna 22. Since the system is typically configured such that the RF system operating range will be approximately commensurate with the optical operating range of the traffic preemption system, remote RF authenticator 12 will typically include the same or at least a compatible RF transceiver system. The transmitted RF authentication signal from intersection RF authenticator 10 is received by antenna 22 of remote RF authenticator 12. This incoming RF signal is designated in FIG. 3 as the "received RF authentication challenge signal."

Figure 7:
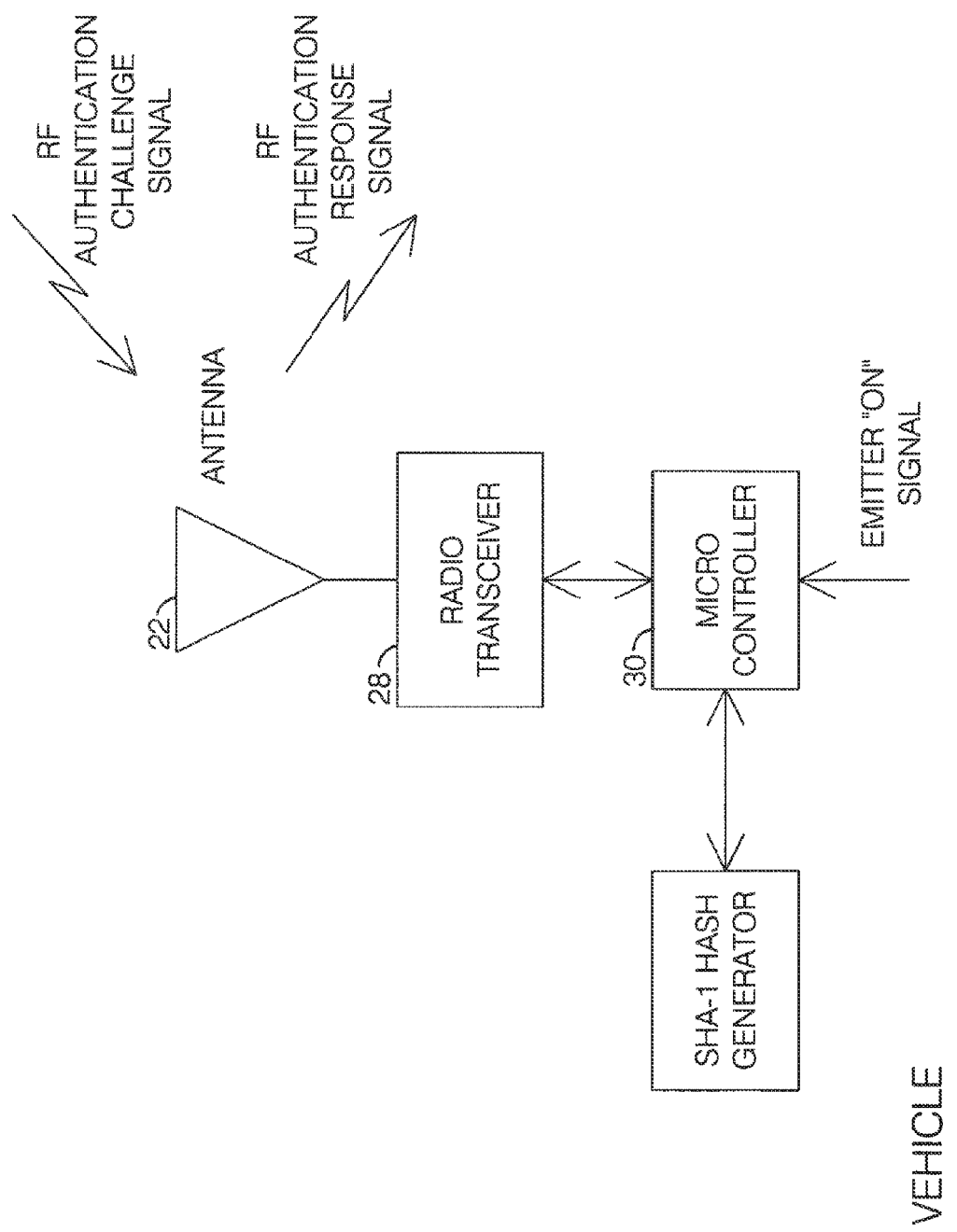
FIGS. 7A and 7B illustrate in greater detail the encryption system utilized in the FIG. 3 authentication system.
Figure 7:
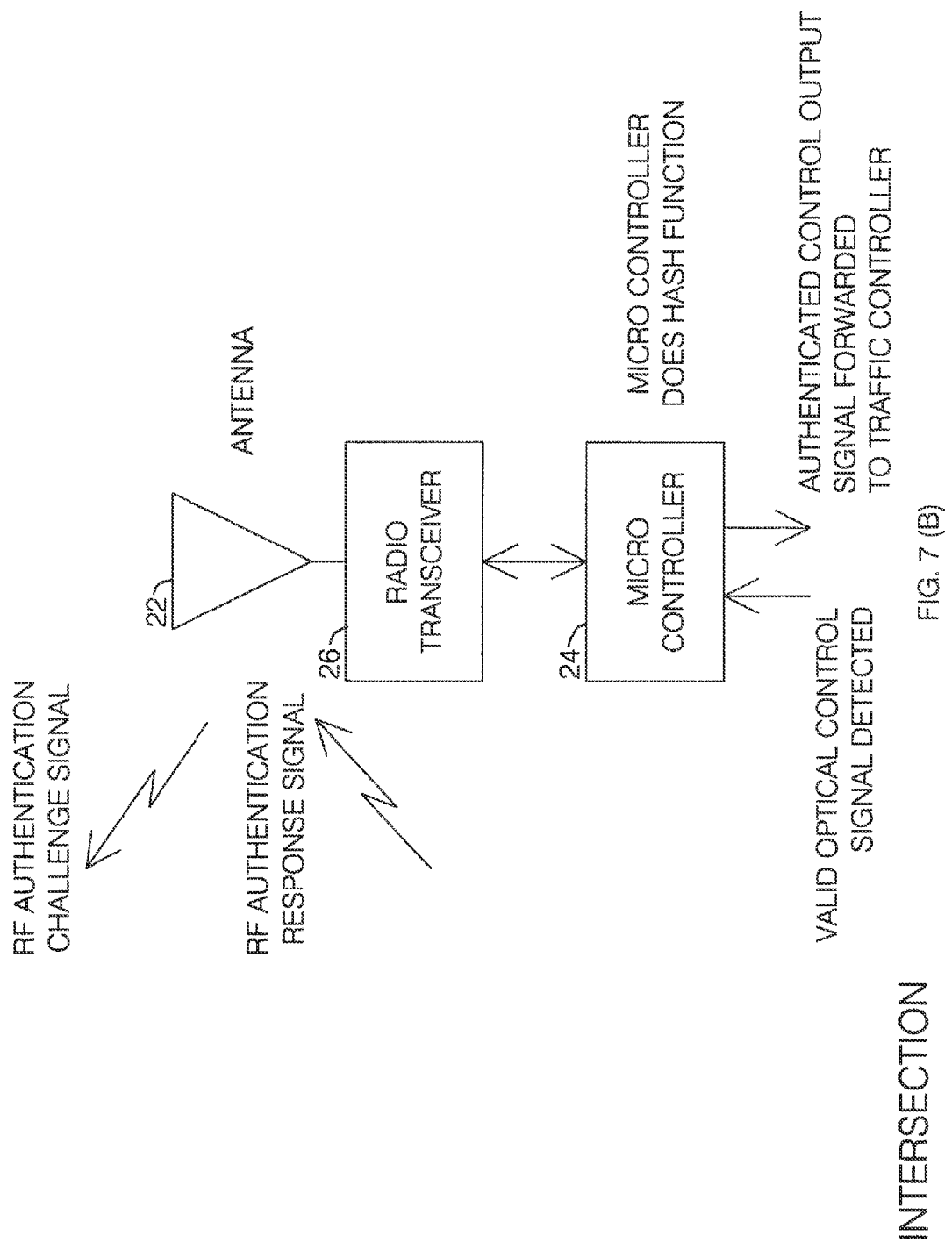

Referring now also to FIGS. 7A and 7B, intersection RF authenticator 10 includes a microcontroller 24 and a radio transceiver 26. When microcontroller 24 receives a valid optical control signal from optical signal processor 18, controller 24 implements the computer algorithm illustrated in the FIG. 8B flow chart which results in transmission of a digitally encrypted signal which is forwarded to transceiver 26 and is then radiated from antenna 22 in the form of an RF encrypted authentication challenge signal.

The FIG. 4 timing diagram illustrates that first the optical emitter approaches within detection range of optical signal detector 16 and is detected. Shortly thereafter, as illustrated by the next line of the FIG. 4 timing diagram, optical signal processor 18 generates an output signal at the input of intersection RF authenticator 10 indicating that a valid optical control signal has been detected. The next line of the FIG. 4 timing diagram illustrates the relative timing of the transmission of a sequence of RF authentication challenge signals.

When the RF authentication challenge signals are received by antenna 22 of remote RF authenticator 12, they are passed to radio transceiver 28 where the encrypted data is detected and passed to microcontroller 30.

As illustrated by the FIG. 8A timing diagram, remote RF authenticator 12 implements an algorithm which causes transceiver 28 to respond with a second digitally encrypted signal referred to in the FIG. 3 diagram as the "transmitted RF authentication response signal." When that signal is received by the intersection base station transceiver 26, the digital data is detected, demodulated and passed to the input of microcontroller 24 which again implements the algorithm illustrated in the FIG. 8B flow chart. If microcontroller 24 determines that the authentication response signal generated by the remote RF authenticator 12 is compatible with the transmitted RF authenticated challenge signal, then as illustrated in the FIG. 4 timing diagram, the intersection RF authenticator 10 generates an authenticated control output signal which is coupled to the preemption input of traffic controller 20.

In the presently preferred embodiment of the invention, radio transceivers 26 and 28 represent off-the-shelf RF transceivers commercially available from the MaxStream Company of Lindon, Utah and are designated as XStream™ wireless OEM modules which operate on either the 900 MHz or 2.4 GHz bands as frequency hopping spread spectrum transceivers.

As is apparent from the FIG. 3 block diagram, the authentication system of the present invention can readily be retrofitted to existing traffic preemption systems. For the vehicle-based mobile element of the authentication system, remote RF authenticator 12 is coupled to be electrically energized whenever remote preemption emitter 14 is energized. Applying power to remote RF authenticator 12 places transceiver 28 in the receive/standby operating mode awaiting reception of an incoming RF authentication challenge signal from the intersection base station.

As illustrated in FIG. 3, the intersection RF authenticator 10 is coupled in series with the existing output of optical signal processor 18 and the existing preemption input of traffic controller 20.

Figure 8:
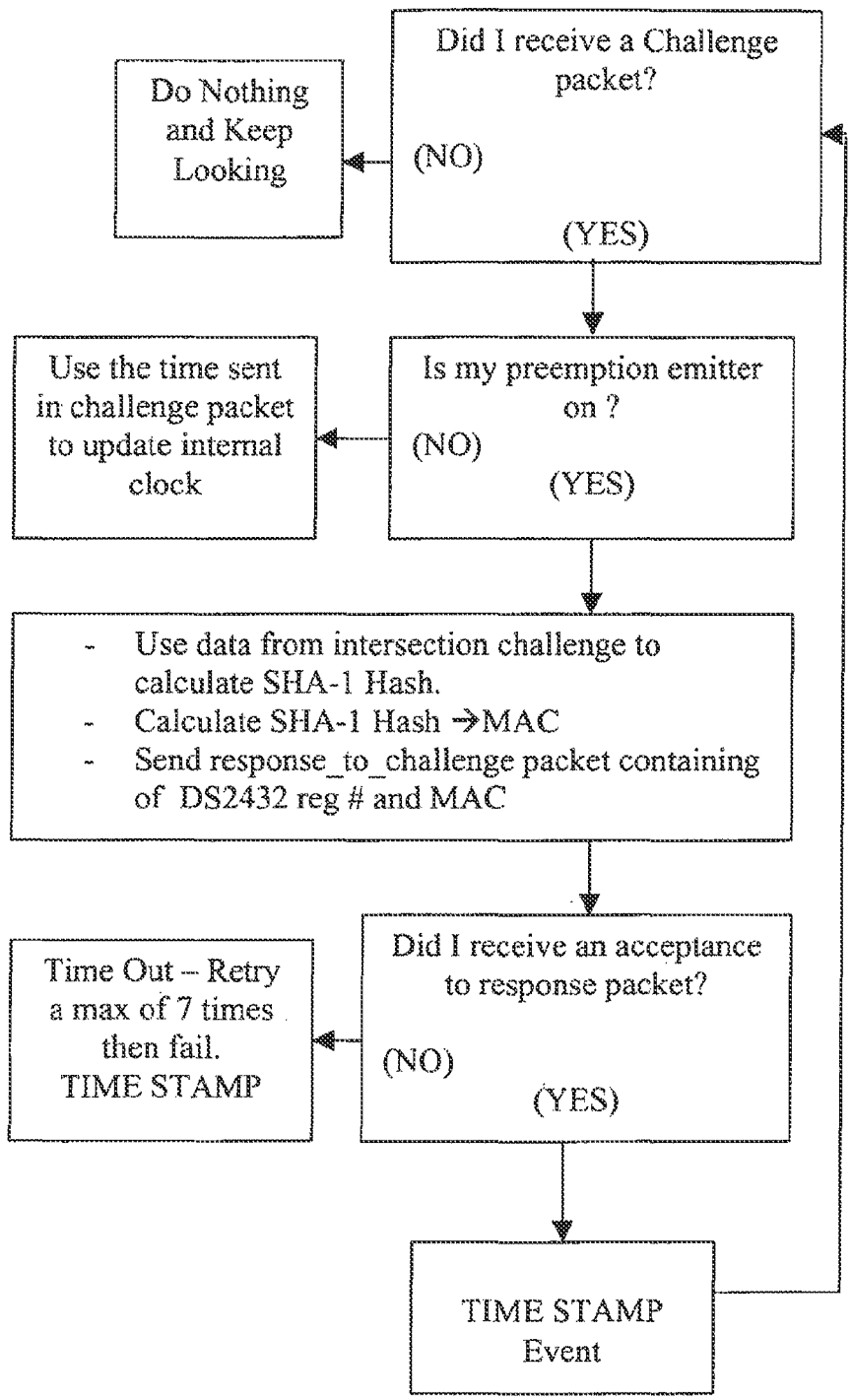
FIGS. 8A and 8B represent flow chart diagrams explaining the software coding for the vehicle-located microcontroller (FIG. 8A) and for the intersection-located microcontroller (FIG. 8B).
Figure 8:
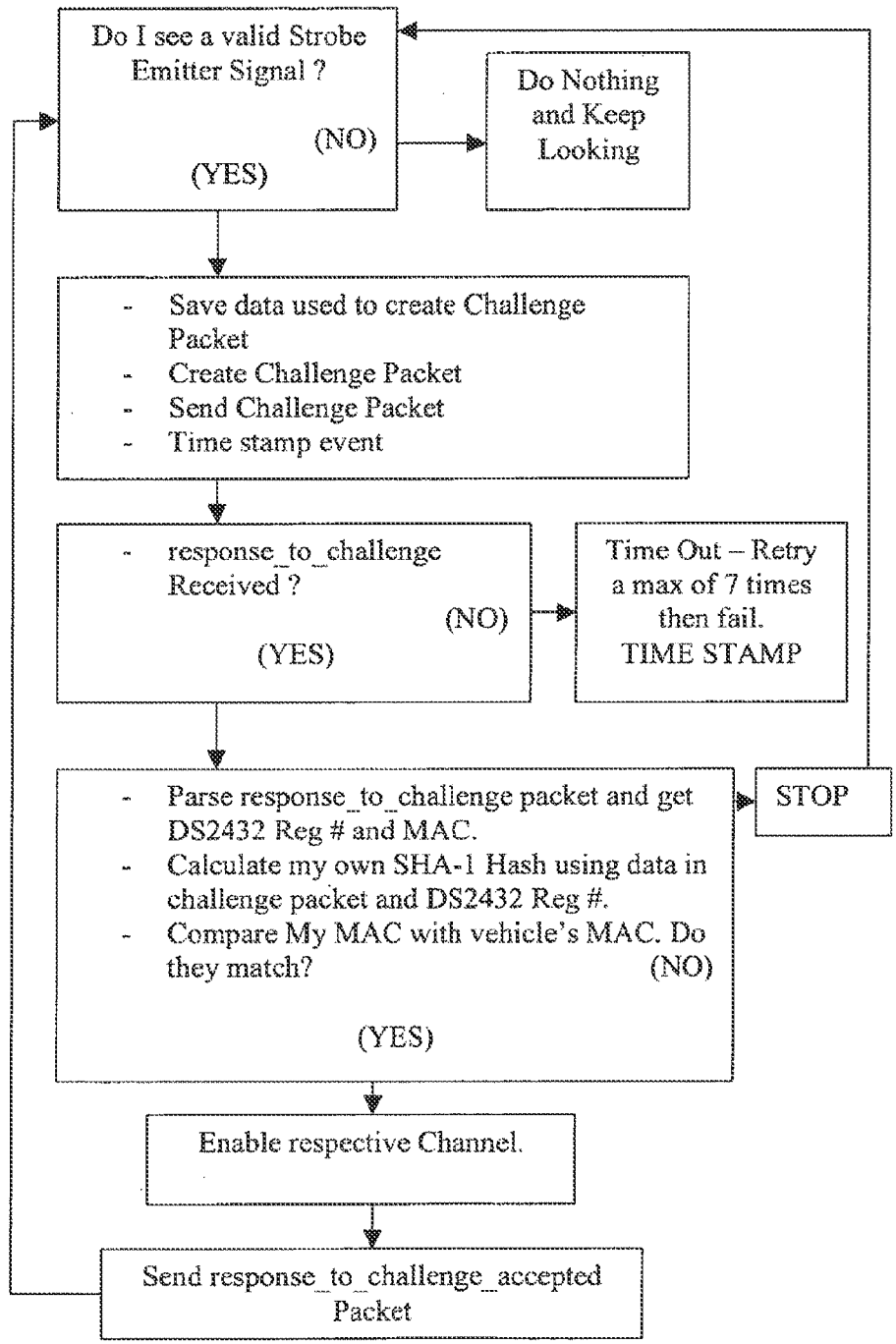

The SHA-1Hash algorithm identified in the FIG. 8 flow charts is a highly secure data encryption algorithm available from the United States Government. The various intersection-based and vehicle-based elements of the authentication system of the present invention must each be separately identified by a unique serial number and must be preprogrammed with a system password. Since unauthorized users do not know the relevant serial number and password information and presumably cannot conveniently obtain the necessary UHF transceiver equipment and microcontrollers, the simple addition of these easily retrofittable authentication components can with minimal installation effort convert an existing unsecure traffic preemption system into a hacker-proof, highly secure preemption system.

Since the components of the authentication system of the present invention are essentially off-the-shelf electronic circuits which are readily available at low cost, incorporating the highly secure authentication system of the present invention into existing unsecure traffic preemption systems can be achieved with relatively low installation cost.

High performance, modular RF transceiver technology has been selected to substantially facilitate the initial installation and setup of the authentication system in existing street and road traffic control systems. For example, the intersection-transceiver 26 can be installed within the existing housing of traffic controller 20. Antenna 22 can be physically attached to the housing of traffic controller 20 or can be interconnected by a short length of coax cable to a nearby light pole or other existing physical support structure. As a result, it is not necessary to connect any additional electric power, RF or control wiring between traffic controller 20 and the remotely located optical signal detector 16. To the extent the authentication system antenna 22 is damaged or vandalized, the authentication system renders the preemption system inoperative.

Figure 5:
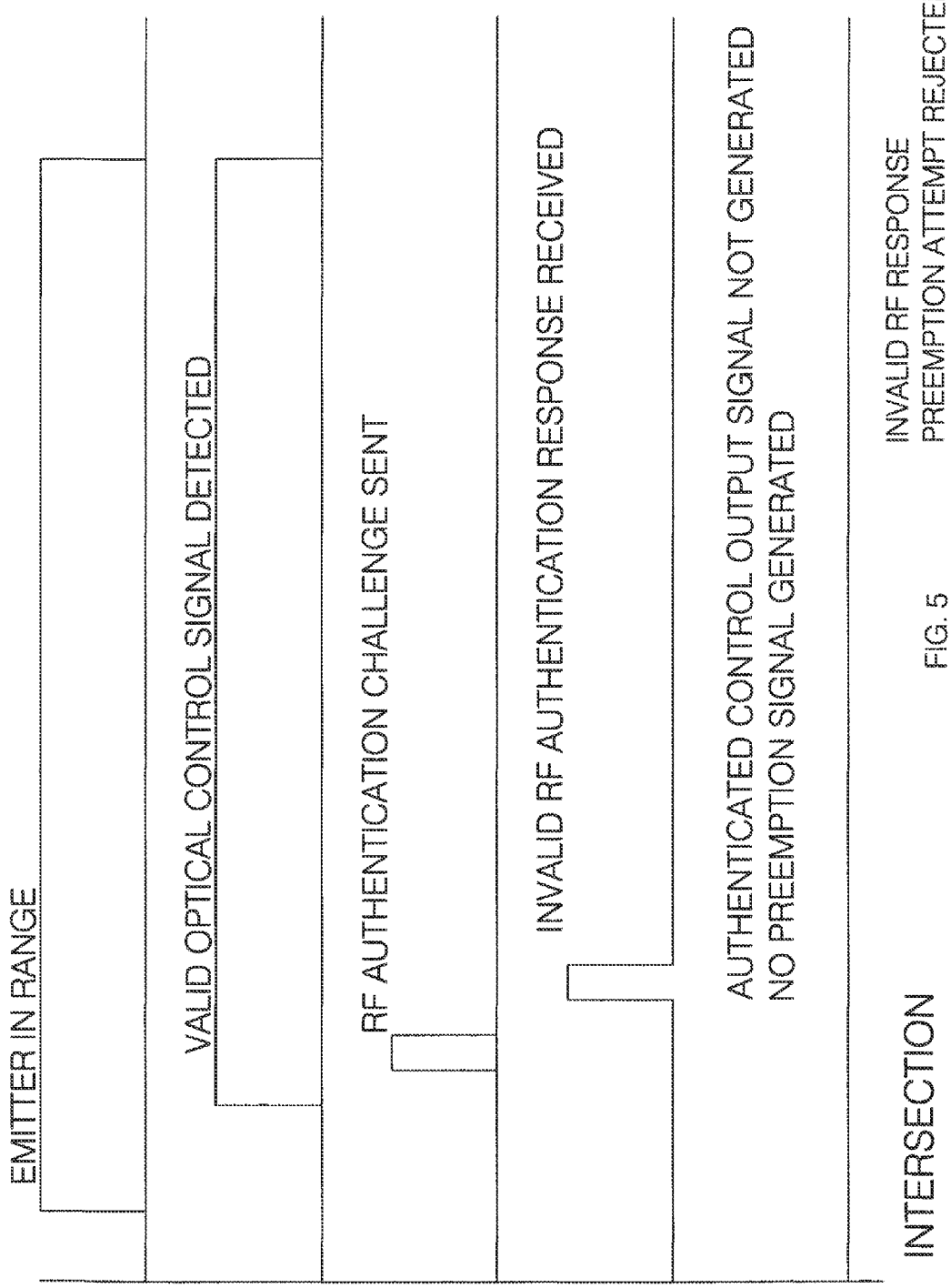
FIG. 5 represents a second timing diagram relating to the system illustrated in the FIG. 3 block diagram.
Figure 6:
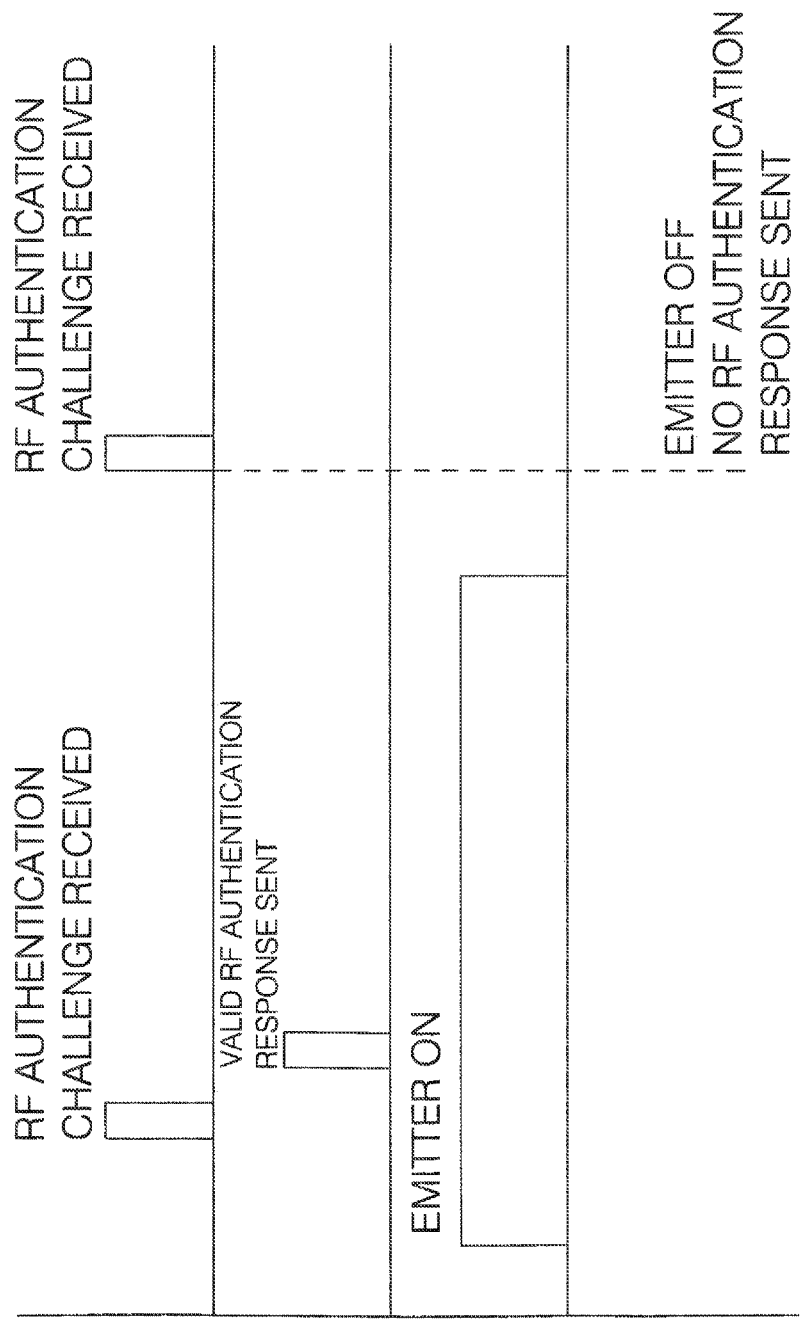
FIG. 6 represents another timing diagram illustrating another operating mode for the FIG. 3 system.

The FIG. 5 timing diagram illustrates system operation when a valid optical control signal is detected, an RF authentication challenge signal is transmitted, but an invalid RF authentication response is received. As illustrated in FIG. 5, the system merely refuses to generate an authentication control output signal and will accordingly not pass a preemption activation signal to traffic controller 20. The FIG. 6 timing diagram illustrates that whenever the vehicle-mounted emitter is deactivated and an RF authentication challenge signal is subsequently received by remote RF authenticator 12, the system merely declines to generate a subsequent RF authentication response signal which prevents continuing activation of the intersection-based traffic preemption system.

Figure 9:
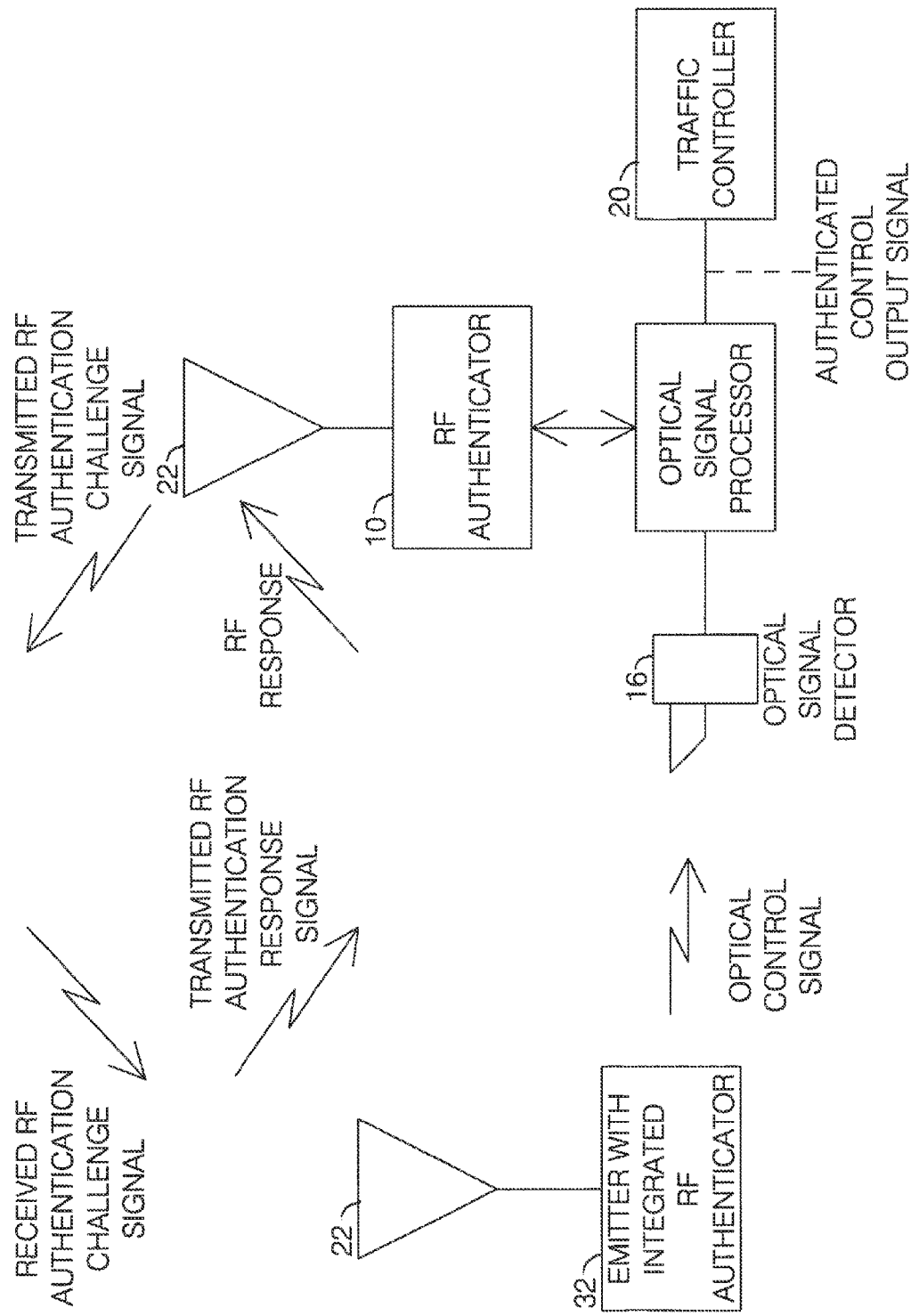
FIG. 9 represents another embodiment of the authentication system of the present invention where the optical emitter and the RF authenticator have been integrated.

The FIG. 9 block diagram merely illustrates that the remote RF authenticator 12 and remote emitter 14 illustrated in FIG. 3 can be integrated into a single block 32. The same is the case for the intersection-based hardware, which for non-retrofit situations can be originally manufactured to provide a more integrated mechanical and electronic system.

Figure 10:
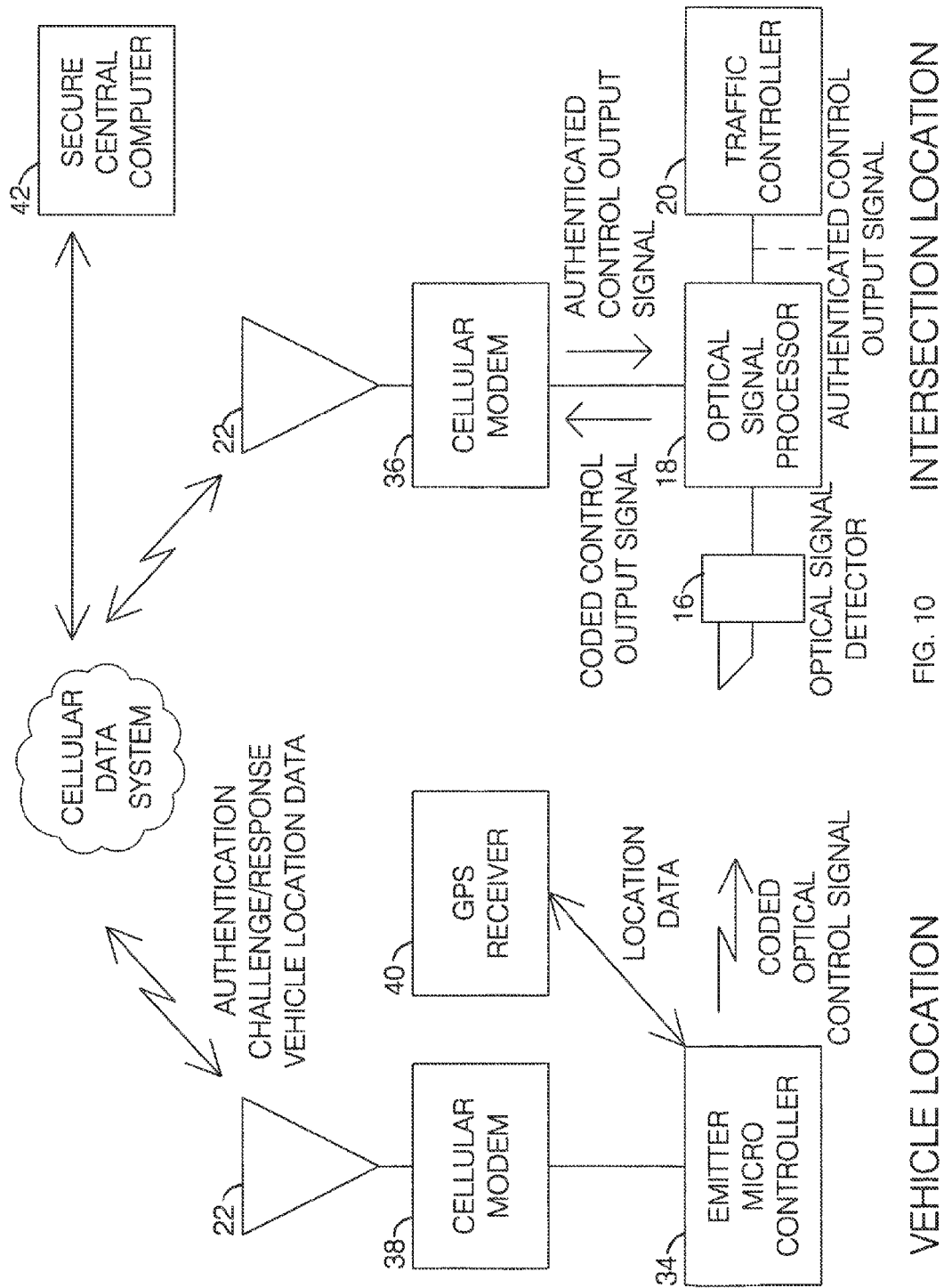
FIG. 10 illustrates another embodiment of the authentication system of the present invention wherein real time data communication is established between the remote optical emitter and the optical signal processor by utilizing a pair of cellular modems in combination with a standalone cellular data system.

The FIG. 10 block diagram illustrates that the vehicle-based system may utilize an integrated emitter/microcontroller 34 capable of generating a specially coded, vehicle-designating coded optical signal which is detected and decoded by optical signal detector 16. That decoded output signal is passed to optical signal processor 18 which has been modified to include electronic circuitry capable of implementing the FIG. 8B encryption algorithm. The data encryption signal is passed from optical signal processor 18 to a cellular modem 36 which provides an RF data communications link via an existing data cellular data system with vehicle-based cellular modem 38. The vehicle-based system also includes a GPS receiver 40 which, on a real time basis, communicates highly accurate vehicle position or location information to emitter microcontroller 34.

As a result of such system operation, reception via the cellular data system of an authentication challenge signal results in implementation of the FIG. 8A data processing algorithm and the retransmission of both a compatible authentication response signal as well as data representing the GPS-based vehicle location information.

A secure central computer 42 is interconnected via the cellular data system with all elements of the FIG. 10 traffic preemption system, traffic control system and authentication system. Central computer 42 essentially creates a geographic system map which plots the relative proximity between a vehicle having an activated traffic preemption system emitter and the location of intersections having traffic preemption systems subject to control by central computer 42. When central computer 42 determines than an activated vehicle emitter is within a defined proximity of and is heading toward an intersection having a preemption control system, central computer 42 will, upon receipt of appropriate authentication challenge and response data via the cellular system, transmit information to cellular modem 36 to cause traffic controller 20 to preempt the appropriate direction of traffic flow to allow the vehicle operating in the preemption mode to expedite movement through the preempted intersection.

Traffic preemption systems can readily be programmed to attribute a high priority preemption signal to emergency vehicles such as police cars and fire engines which will cause traffic controllers 20 to more quickly be reconfigured into the preemption mode for the desired direction of emergency vehicle travel. Alternatively, for lower priority transit vehicles utilizing selectively coded serial numbers, central computer 42 can be programmed to accord a lower priority preemption operating mode less disruptive to the existing flow of traffic by having the system communicate the lower priority preemption mode signal to traffic controller 20.

The authentication and preemption systems illustrated in the FIG. 10 block diagrams by utilizing existing cellular data system infrastructure, avoids the requirement for direct line of sight RF signaling between the vehicle-based authentication system and intersection-based authentication system illustrated in FIG. 3. With cellular data systems, third party carriers are responsible for providing the necessary RF communication infrastructure which generally ensures wide area, uniform coverage. As a result, even in cities such as New York City and Chicago with numerous RF-blocking buildings, the FIG. 10 cellular data system authentication system may provide more uniform system operation and coverage.

Although the preferred embodiment of the invention has been described in connection with only a limited number of block diagram configurations, the authentication system of the present invention could readily be implemented in many other ways using various other forms of hardware and numerous other types of either more straightforward or more complex data encryption algorithms. Accordingly, it is intended by the appended claims to cover all such modifications of the invention which fall within the true spirit and scope of the invention.

We claim:

1. A traffic authentication system that authenticates remotely generated optical control signals from a vehicle, the traffic authentication system comprising:
   a remote optical emitter coupled to a vehicle and configured to transmit an optical control signal from a remote location;
   a remote authentication device collocated with the remote optical emitter, the remote authentication device configured to receive a radio frequency authentication challenge signal and transmit a compatible authentication response signal in response to the challenge signal;
   an optical signal processor positioned at a traffic control location and configured to receive the optical control signal from the remote optical emitter and generate a control output signal in response to detection of a valid optical control signal; and
   a control authentication device coupled by a data communications link to the optical signal processor, the control authentication device configured to receive the control output signal from the optical signal processor, transmit the radio frequency authentication challenge signal to the remote authentication device in response to receipt of the control output signal, and generate an authenticated control output signal in response to receipt of a valid authentication response signal from the remote authentication device.

2. The traffic authentication system of claim 1 wherein the traffic control location is a security gate.

3. The traffic authentication system of claim 1 wherein the traffic control location is a motor controlled gate.

4. The traffic authentication system of claim 1 wherein the traffic control location is a traffic intersection.

5. The traffic authentication system of claim 1 wherein the traffic control location is an electrically controlled security gate.

6. The traffic authentication system of claim 1 wherein the data communications link comprises a first RF transceiver collocated with the optical signal processor and a second RF transceiver collocated with the remote optical emitter.

7. The traffic authentication system of claim 6 wherein the optical signal detector comprises a directional optical input port configured to receive optical signals emitted from a single direction.

8. The traffic authentication system of claim 1 wherein the control authentication device is collocated with the optical signal processor.

9. The traffic authentication system of claim 1 wherein the data communications link comprises a first cellular modem collocated with the optical signal processor and a second cellular modem collocated with the remote optical emitter.

10. The traffic authentication system of claim 1 wherein the data exchanged over the data communications link represents encrypted digital data.

11. The traffic authentication system of claim 10 wherein the digital data incorporated in the authentication response signal is generated by a microcontroller collocated with the remote optical emitter.

12. The traffic authentication system of claim 11 wherein the encrypted digital data incorporated in the radio frequency authentication challenge signal is generated by a microcontroller collocated with the optical signal processor.

13. The traffic authentication system of claim 12 wherein the data communications link comprises a first cellular modem collocated with the optical signal processor and a second cellular modem collocated with the remote optical emitter, wherein the authentication device is positioned at a second location and is coupled to exchange data with the first and second cellular modems.

14. The traffic authentication system of claim 13 further comprising a GPS receiver that transmits vehicle location data via the second cellular modem to the authentication device.

15. The traffic authentication system of claim 1 wherein the remote optical emitter transmits a coded optical control signal which uniquely identifies the vehicle.

16. A method of authenticating remotely generated optical control signals associated with traffic control, the method comprising:
   generating an optical control signal at a remote location using a remote optical emitter that is coupled to a vehicle;
   receiving the optical control signal at a traffic control location and generating a control output signal in response to detection of a valid optical control signal;
   transmitting a radio frequency authentication challenge signal to the remote location from the traffic control location in response to receipt of the control output signal;
   receiving, by an optical signal processor, the radio frequency authentication challenge signal at the remote location and transmitting a corresponding authentication response signal to the traffic control location; and
   receiving via a data communications link, the corresponding authentication response signal at the traffic control location, validating the authentication response signal, and generating an authenticated control output signal in response to detection of a valid authentication response signal.

17. The method of claim 16 further comprising authorizing opening of a security gate at the traffic control location in response to the authenticated control output signal.

18. The method of claim 16 further comprising authorizing opening of a motor controlled gate at the traffic control location in response to the authenticated control output signal.

19. The method of claim 16 further comprising changing the color of a traffic light at the traffic control location in response to the authenticated control output signal.

20. The method of claim 16 further comprising authorizing opening of an electronically controlled security gate at the traffic control location in response to the authenticated control output signal.

21. The method of claim 16 further comprising transmitting a coded optical control signal from the remote optical emitter which uniquely identifies the vehicle.

22. The method of claim 16 further comprising generating digital data and incorporating that digital data in the authentication response using a microcontroller collocated with the remote optical emitter.

* * * * *